(12) United States Patent
Van Der Meer

(10) Patent No.: US 8,047,939 B2
(45) Date of Patent: Nov. 1, 2011

(54) TRANSVERSE ELEMENT FOR A DRIVE BELT FOR A CONTINUOUSLY VARIABLE TRANSMISSION

(75) Inventor: Cornelis Johannes Maria Van Der Meer, Tilburg (NL)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 12/441,432

(22) PCT Filed: Aug. 27, 2007

(86) PCT No.: PCT/EP2007/058859
§ 371 (c)(1),
(2), (4) Date: Jun. 4, 2009

(87) PCT Pub. No.: WO2008/031713
PCT Pub. Date: Mar. 20, 2008

(65) Prior Publication Data
US 2010/0029427 A1   Feb. 4, 2010

(30) Foreign Application Priority Data

Sep. 15, 2006 (NL) ...................................... 1032506

(51) Int. Cl.
*F16G 1/22* (2006.01)
(52) U.S. Cl. .................. 474/242; 474/244; 474/245
(58) Field of Classification Search .................. 474/242, 474/244–245
See application file for complete search history.

(56) References Cited

U.S. PATENT DOCUMENTS

| 6,676,553 | B2 * | 1/2004 | Van Lith et al. | 474/242 |
| 6,857,980 | B2 * | 2/2005 | van Liempd et al. | 474/242 |
| 7,029,411 | B2 * | 4/2006 | Van Lith et al. | 474/201 |
| 7,294,077 | B2 * | 11/2007 | Wang et al. | 474/201 |
| 2001/0056002 | A1 * | 12/2001 | Van Lith et al. | 474/242 |
| 2002/0032090 | A1 * | 3/2002 | Van Lith et al. | 474/242 |
| 2002/0187868 | A1 * | 12/2002 | Liempd et al. | 474/242 |
| 2005/0187056 | A1 * | 8/2005 | Wang et al. | 474/242 |

FOREIGN PATENT DOCUMENTS

| EP | 1 493 943 | 1/2005 |
| JP | 2003-269546 | 9/2003 |
| JP | 2004-353755 | 12/2004 |
| WO | 2004/053355 | 6/2004 |

OTHER PUBLICATIONS

International Search Report dated Sep. 25, 2007, from corresponding PCT application.

* cited by examiner

*Primary Examiner* — Sang Kim
(74) *Attorney, Agent, or Firm* — Young & Thompson

(57) ABSTRACT

A transverse element for a drive belt, includes a recess on either side for at least partially accommodating a ring assembly of the drive belt. The transverse element includes a base part lying radially inside the recesses, a connecting piece lying between the recesses, and a head part lying radially outside the recesses, the base part on either side of the connecting piece being provided with a radially outwardly directed saddle surface for contact with a ring assembly, and between a saddle surface and the connecting piece a notch being provided, in which notch a convexly curved part connects to the respective saddle surface, and in which notch a concavely curved part connects to a respective substantially axially directed side face of the connecting piece. The concavely curved part on either side of a radially most inward lying part thereof has a mutually differing degree of curvature.

12 Claims, 2 Drawing Sheets

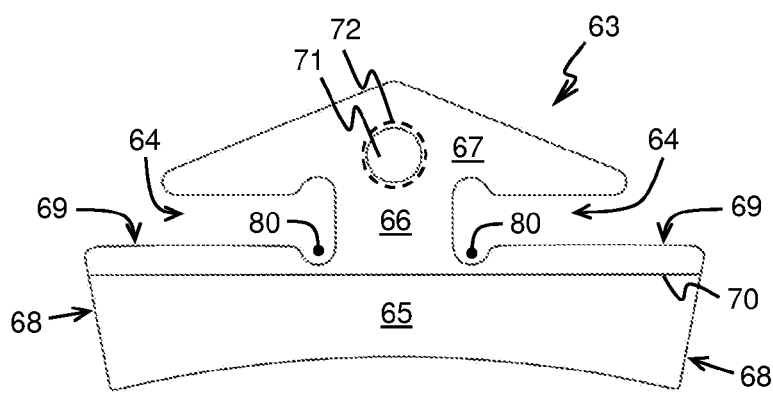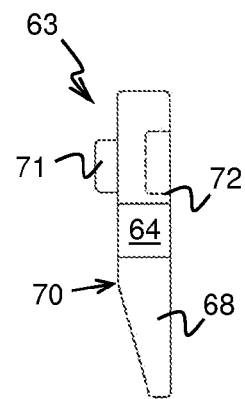
FIG. 3a  FIG. 3b
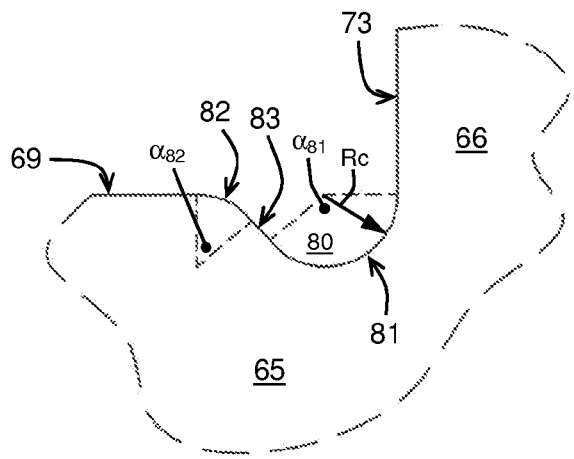
FIG. 4
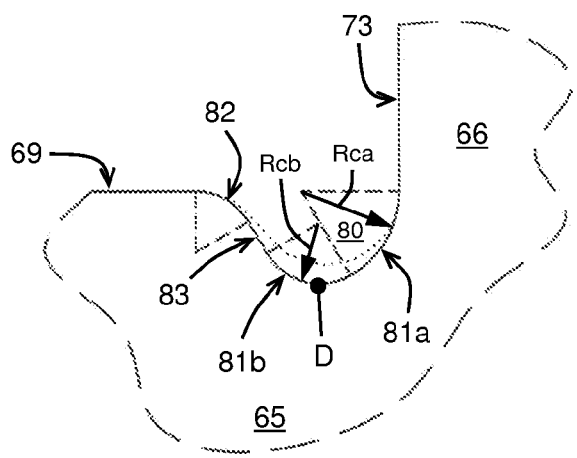
FIG. 5

US 8,047,939 B2

TRANSVERSE ELEMENT FOR A DRIVE BELT FOR A CONTINUOUSLY VARIABLE TRANSMISSION

BACKGROUND OF THE INVENTION

The present invention relates to a transverse element for a drive belt for a continuously variable transmission having two pulleys, each composed of two pulley sheaves with an at least partially conical contact face for wedging in the drive belt in pairs. The known drive belt comprises two assemblies of endless, i.e. self-contained ribbon-shaped rings on which a large number of transverse elements are fitted more or less continuously and so as to be movable around the circumference of said rings. For this purpose, the transverse elements are provided on either side with a recess for at least partially accommodating the ring assemblies. Such a drive belt is also sometimes called a Van Doorne push belt.

Each transverse element is composed of a base part lying radially inside said recesses, a connecting piece lying between the recesses, and a head part lying radially outside the recesses. Furthermore, the base part comprises two pulley sheave contact faces which diverge radially outwards from each other and form the axial ends of said base part, which contact faces are intended for frictional contact with the pulley sheaves, and comprise two ring assembly contact faces, in short saddle surfaces, directed substantially radially outwards, which contact faces are situated on either side of the connecting piece and are intended for frictional contact with the ring assemblies. Furthermore, between the individual saddle surfaces and the connecting piece the base part is in each case provided with a notch, at the position of which the surface of the base part in a convex curvature connects to the saddle surface and in a concave curvature connects to a substantially axially directed side face of the connecting piece.

Such a drive belt and transverse element are generally known and are disclosed in, for example, European patent application number EP-A-1570191. It is also generally known that the so-called local stress-increasing or notch effect of the notches in the base part makes the transverse elements susceptible to a fatigue fracture of their base parts. On the basis of general theory on the notch effect phenomenon, it can be expected that such fatigue fracture will generally start in or near the most radially inward lying part, in other words the bottom, of the notch. This is in fact confirmed by a theoretical 2D FEM analysis of the stresses occurring in the base part of the drive belt during its operation as a result of the radial forces exerted upon the saddle surfaces by the ring assemblies, combined with the axial clamping forces exerted on either side of the base part upon the pulley sheave contact faces of said base part. Clearly, the strength, i.e. the load-bearing capacity, of the known transverse element can be improved by reducing the stress-increasing effect of the notches. A known measure to this effect is to reduce the concave curvature of the abovementioned bottom of the notches, or to increase their radius of curvature, as already disclosed in greater detail in patent publications JP-A-2003/269546 and JP-A-2004/353755.

The object of the present invention is to improve the load-bearing capacity of the transverse element according to the prior art by optimizing its geometry, more particularly that of its notches, to that end. This object is achieved according to the invention with the transverse element according to Claim 1.

SUMMARY OF THE INVENTION

According to the invention, on either side of a most radially inward lying part thereof the concave part of the notch is provided with a mutually differing degree of curvature, an average or effective radius of curvature of the concave part of the notch on the side of the side face of the connecting piece being greater than an average radius of curvature on the side of the convex part of the notch. More particularly, the highest value of the radius of curvature occurs at the point where the abovementioned concave part connects to the side face of the connecting piece. Even more particularly, the lowest value of the radius of curvature of the abovementioned concave part occurs in the most radially inward lying part of the notch. Even more particularly, the radius of curvature of the abovementioned concave part decreases more or less uniformly from the abovementioned side face towards and into the most radially inward lying part of the notch.

The underlying idea of the present invention is that, at least during normal operation of the drive belt, the internal stress in the known transverse element assumes the highest value on the connecting piece side of the notch. Therefore, although the fatigue fracture of the base part of an individually tested transverse element does indeed—in other words as is to be expected on theoretical grounds—start on the bottom of the notch, in practice the start of the fracture will, however, be located more in the direction of the connecting piece. An improvement of the fatigue strength of the drive belt as a whole can therefore be achieved in a surprisingly simple manner according to the invention by providing the concave part of the notch with an asymmetrical shape, in such a way that relative to the centre of the abovementioned concave part the greatest radius of curvature or radii of curvature of the concave part occur(s) on the connecting piece side thereof.

BRIEF DESCRIPTION OF THE DRAWINGS

The invention will be explained in greater detail below by the description of a transverse element according to the invention with reference to the drawing, in which:

FIG. 3a is a front view of a transverse element of the drive belt;

FIG. 3b is a side view of a transverse element of the drive belt;

FIG. 4 illustrates a detail of the front view shown in FIG. 3a; and

FIG. 5 shows a detail of a transverse element according to a preferred embodiment of the invention.

DETAILED DESCRIPTION OF THE PREFERRED EMBODIMENTS

Figure 1:
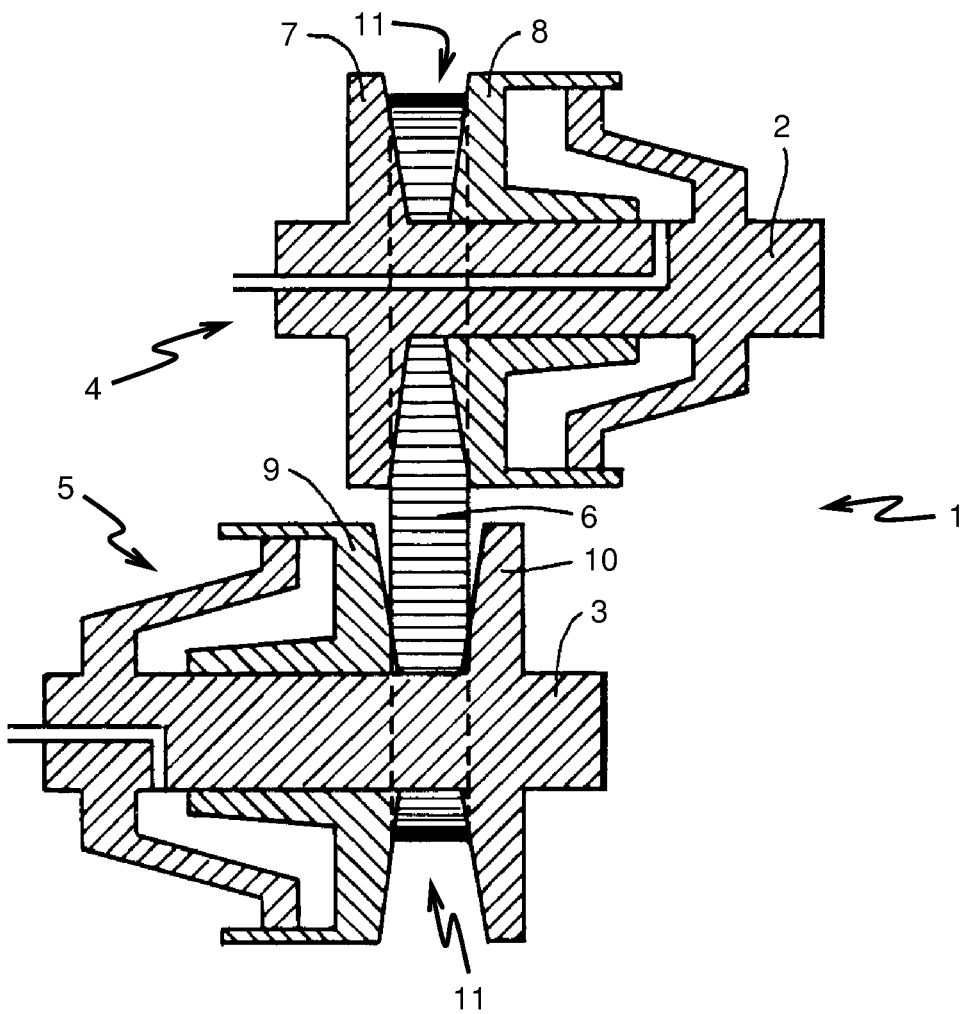
FIG. 1 is a diagrammatically illustrated section of a continuously variable transmission with a drive belt.
Figure 2:
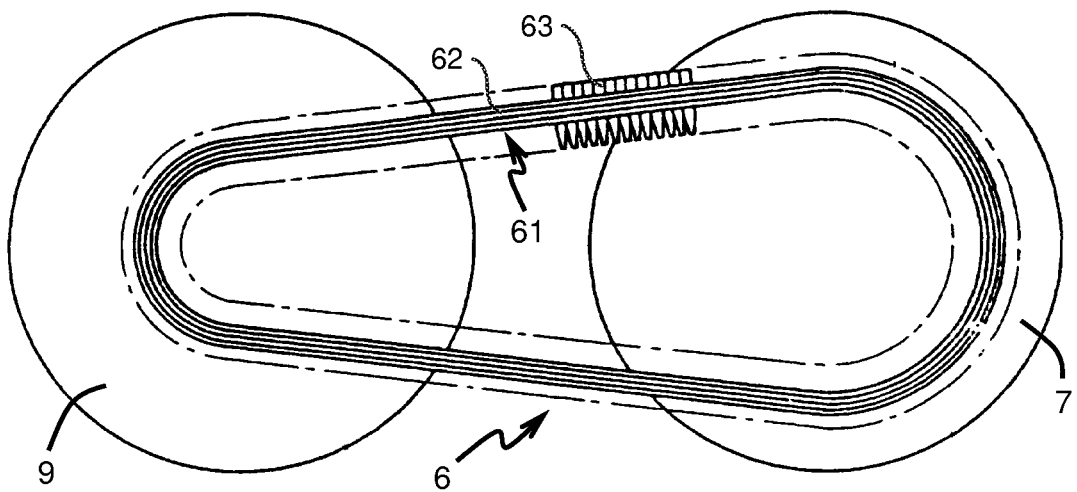
FIG. 2 shows a diagrammatic side view of a part of the transmission with the drive belt shown in FIG. 1.

FIGS. 1 and 2 show diagrammatically a continuously variable transmission, such as that for use in a motor vehicle. The continuously variable transmission is indicated in its entirety by reference numeral 1.

The continuously variable transmission 1 comprises two pulleys 4 and 5 fitted on separate pulley shafts 2 and 3. An endless, self-contained drive belt 6 is fitted around the pulleys 4 and 5, and serves to transmit torque between the pulley shafts 2 and 3. The pulleys 4 and 5 are each provided with two conical pulley sheaves 7 and 8 and 9 and 10 respectively, which together form a tapering accommodation groove 11 in which the drive belt 6 is accommodated. The transmission ratio of the continuously variable transmission is determined by the ratio of the running radii of the drive belt 6 in the accommodation grooves 11 of the respective pulleys 4 and 5.

The running radii can be varied by moving the pulley sheaves 7 and 8 and 9 and 10 respectively towards and away from each other respectively by means of movement means, which for the sake of simplicity are not shown. For this purpose, at least one of the pulley sheaves 7 and 8 and 9 and 10 respectively is arranged so as to be axially movable. In order to transmit a torque between the pulley shafts 2 and 3, the drive belt 6 is wedged in with a certain clamping force between the pulley sheaves 7 and 8 and 9 and 10 respectively of the pulleys 4 and 5.

FIG. 2 shows in a simplified axial section of the transmission 1 of FIG. 1 that the drive belt 6 comprises a ring assembly 61, which is composed of a number of flat rings 62 stacked on top of one another, in addition to a considerable number of transverse elements 63, of which for the sake of simplicity only a limited number are shown in the side view of FIG. 2. The transverse element 63 of the drive belt is shown in FIG. 3a in front view, i.e. viewed in the circumferential direction of the drive belt 6, and in FIG. 3b in side view, i.e. in the axial direction of said drive belt.

The known transverse element 63 is provided with a recess 64 on either side, for the purpose of at least partially accommodating a ring assembly 61 of the drive belt 6, which in this exemplary embodiment therefore comprises two of such ring assemblies 61, and is composed of a base part 65 lying radially inside the abovementioned recesses 64, and comprises a connecting piece 66 lying between the recesses 64, and a head part 67 lying radially outside the recesses 64. The axial ends of the base part 65 are formed by two contact faces 68 diverging radially outwards from each other, which contact faces are intended for frictional contact with the abovementioned pulley sheaves 6-9. In addition, the base part 65 is provided with two ring assembly contact faces 69, in short saddle surfaces 69, directed radially outwards, which saddle surfaces are each situated on a different side of the connecting piece 66 and are intended for frictional contact with a different ring assembly 61. Between a saddle surface 69 and the connecting piece 66 the base part 65 is provided in each case with a notch 80.

As shown in FIGS. 3a and 3b, the base part 65 of the transverse element 63 is provided with a so-called roll-off area 70, which extends in the axial direction between the pulley sheave contact faces 68 of said base part and forms a transition between a top part of the transverse element 63 provided with a more or less constant thickness and a bottom part of said transverse element which tapers radially inwards, i.e. its thickness decreases in that direction. Partly because of this, the transverse elements 63 are tiltable relative to each other in the drive belt 6, and the drive belt 6 can be bent as a whole in the circumferential direction. The known transverse element 63 is also provided with a projection 71 and with a depression 72, in the drive belt 6 the projection 71 of a first of two successive transverse elements 63 being accommodated in the depression 72 of a second transverse element 63 of said drive belt, for the purpose of positioning them relative to each other.

FIG. 4 shows in detail the notch 80 in the base part 65 in the front view of the known transverse element 63. The notch 80 is defined by a curvilinear, concavely curved part 81 of the surface of the base part 65, a curvilinear, convexly curved part 82 of said surface of the base part, having between them a rectilinear or flat part 83 of the surface of the base part 65. Furthermore, the abovementioned concave part 81 connects to a substantially axially directed side face 73 of the connecting piece 66, and the convex part 82 connects to the saddle surface 69. In FIG. 4 the dashed lines indicate the angles $\alpha_{81}$ and $\alpha_{82}$ respectively enclosed by the curvilinear parts 81 and 82 of the notch 80.

From the point of view of optimum fatigue strength, i.e. load-bearing capacity of the transverse element 63, it is advantageous to use the greatest possible radius of curvature for at least the concave part 81 of the notch 80, in such a way that the stress-increasing effect, or notch effect, of it is minimal. On the other hand, the axial width dimension of the notch 80 in particular increases with an increasing radius of curvature, which is at the expense of the remaining width of the transverse element 63 available for the saddle surface 69, and consequently also of the maximum useful width of the ring assembly 61. A greater radius of curvature influences the load-bearing capacity of the drive belt 6 as a whole, therefore ultimately also in a negative sense.

In the context of the present invention an effort has been made to find an optimum between the two abovementioned, opposite effects. In this case, according to the invention, the adverse effect of a large radius of curvature on the width of the notch 80 is limited as far as possible by using a variable radius of curvature for the concave part 81 of the notch 80, in such a way that the largest radius of curvature Rca is used at the point where the highest internal stresses occur, which according to the invention, is on the connecting piece side 66 of the notch 80. A smaller radius of curvature Rcb is used for the remaining parts of the concave part 81.

FIG. 5 shows such a transverse element 63, in particular the concave part 81 of a notch 80 of said transverse element according to the invention. The abovementioned concave part 81 is composed of two parts 81a and 81b, which are curved to a different degree from each other, of which a first part 81a, which connects to the side face 73 of the connecting piece 66, is provided with a lower degree of curvature than a second part 81b, which connects to the straight part 83 of the notch 80. In other words, the radius of curvature Rca which describes the abovementioned first part 81a is greater than the radius of curvature Rcb which describes the abovementioned second part 81b. The concave part 81 of the notch 80 is therefore, on either side of a radially most inward lying part D thereof, provided with a different degree of curvature, in such a way that the average value of the radius of curvature of the concave part 81 is greater on the side of the side face 73 of the connecting piece 66 than on the side of the convex part 82 of the notch 80.

The two abovementioned radii of curvature Rca, Rcb of the concave part 81 of the notch 80 and the radius of curvature of the convex part 82 thereof can, in addition, be selected in such a way that at least the axial width dimension of the notches 80 remains substantially unchanged relative to the known transverse element 63, as also shown in FIG. 5, in which the dotted line shows the contour of the notch 80 of the known transverse element 63 of FIG. 4.

With the transverse element 63 according to the invention, an improvement of the fatigue strength of the drive belt 6 as a whole is achieved, through the fact that the described shape of the concave part 81 of the notch 80 provides a more advantageous distribution of the internal stress in the base part 65. This means that the higher load occurring according to the invention on the connecting piece side of the notch 80 during operation of the drive belt 6 is at least partially compensated for by using the relatively larger radius of curvature Rca locally. Such an additional and previously not recognized load share according to the invention is possibly connected with the interaction between the projection 71 and the depression 72 of the adjacent transverse elements 63 in the drive belt 6 and the forces occurring in the process.

The invention claimed is:

1. A transverse element for a drive belt for a continuously variable transmission having two pulleys, each composed of two pulley sheaves with an at least partially conical contact face for confining in the drive belt in pairs, comprising two endless ring assemblies and transverse elements which are fitted so as to be movable around the circumference of the ring assemblies, and which are provided with a recess on either side for at least partially accommodating a ring assembly, the transverse element being provided with a base part lying radially inside the recesses, with a connecting piece lying between the recesses, and with a head part lying radially outside the recesses, the base part on either side of the connecting piece being provided with a radially outwardly directed saddle surface for contact with a ring assembly, and between the saddle surface and the connecting piece a notch being provided, in which notch a convexly curved part connects to the respective saddle surface, and in which notch a concavely curved part connects to a respective substantially axially directed side face of the connecting piece, wherein the concavely curved part (81) of the notch (80) in the base part (65) of the transverse element (63) on either of two sides of a radially most inward lying part (D) thereof is provided with a mutually different degree of curvature such that an average radius of curvature of the concavely curved part (81) on a first side toward the side face (73) of the connecting piece (66) is greater than an average radius of curvature on a second side toward the convexly curved part (82) of the notch (80).

2. The transverse element (63) according to claim 1, wherein the concavely curved part (81) comprises at least a first part (81*a*), which connects to the side face (69) of the connecting piece (73), and a second part (81*b*), a radius of curvature (Rca) of the first part (81*a*) being greater than a radius of curvature (Rcb) of the second part (81*b*).

3. The transverse element (63) according to claim 2, wherein the highest value of the radius of curvature (Rca) of the concavely curved part (81) of the notch (80) occurs at the point where said concavely curved part connects to the side face (69) of the connecting piece (73).

4. The transverse element (63) according to claim 3, wherein the lowest value (Rcb) of the radius of curvature (Rca) of the concavely curved part (81) of the notch (80) occurs in the radially most inward lying part (D) of the notch (80).

5. The transverse element (63) according to claim 1, wherein the highest value of the radius of curvature (Rca) of the concavely curved part (81) of the notch (80) occurs a point where said concavely curved part connects to the side face (69) of the connecting piece (73).

6. The transverse element (63) according to claim 5, wherein the lowest value (Rcb) of the radius of curvature (Rca) of the concavely curved part (81) of the notch (80) occurs in the radially most inward lying part (D) of the notch (80).

7. A transverse element for a drive belt for a continuously variable transmission with two pulleys and two endless ring assemblies, the transverse element comprising:

a base part;
a head part; and
a connecting piece connecting the base part to the head part, with recesses between the base part and the head part formed on either side of the connecting piece, the base part on either side of the connecting piece having a radially outwardly directed saddle surface for contact with a ring assembly, and a notch formed between the saddle surface and the connecting piece, the notch having a convexly curved part connected to the saddle surface, and also having a concavely curved part connecting to a substantially axially directed side face of the connecting piece, the concavely curved part of the notch in the base part of the transverse element, on a first side of a radially most inward lying part of the notch toward the side face of the connecting piece, having a first degree of curvature, and on a second side of the radially most inward lying part toward the convexly curved part of the notch, having a second degree of curvature, such that a first average radius of curvature of the concavely curved part on the first side of the radially most inward lying part is greater than a second average radius of curvature of the concavely curved part on the second side of the radially most inward lying part of the notch.

8. The transverse element according to claim 7, wherein the concavely curved part comprises at least a first part, which connects to the side face of the connecting piece, and a second part, a radius of curvature (Rca) of the first part being greater than the radius of curvature (Rcb) of the second part.

9. The transverse element according to claim 8, wherein the highest value of the radius of curvature (Rca) of the concavely curved part of the notch occurs at the point where said concavely curved part connects to the side face of the connecting piece.

10. The transverse element according to claim 9, wherein the lowest value (Rcb) of the radius of curvature (Rca) of the concavely curved part of the notch occurs in the radially most inward lying part of the notch.

11. The transverse element according to claim 7, wherein the highest value of the radius of curvature (Rca) of the concavely curved part of the notch occurs at the point where said concavely curved part connects to the side face of the connecting piece.

12. The transverse element according to claim 11, wherein the lowest value of the radius of curvature (Rca) of the concavely curved part of the notch occurs in the radially most inward lying part (D) of the notch.

\* \* \* \* \*